US009232047B2

(12) United States Patent
Qiu et al.

(10) Patent No.: US 9,232,047 B2
(45) Date of Patent: Jan. 5, 2016

(54) METHOD AND APPARATUS FOR PROVIDING REPEAT CALLING

(75) Inventors: Chaoxin Qiu, Austin, TX (US); Diana Cantu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1558 days.

(21) Appl. No.: 12/333,283

(22) Filed: Dec. 11, 2008

(65) Prior Publication Data

US 2010/0150134 A1 Jun. 17, 2010

(51) Int. Cl.
*H04M 7/00* (2006.01)
*H04M 3/22* (2006.01)
*H04L 12/911* (2013.01)
*H04L 12/927* (2013.01)
*H04L 29/06* (2006.01)

(52) U.S. Cl.
CPC ........... *H04M 3/2227* (2013.01); *H04L 47/781* (2013.01); *H04L 47/805* (2013.01); *H04L 47/824* (2013.01); *H04L 65/103* (2013.01); *H04L 65/1016* (2013.01); *H04L 65/1096* (2013.01); *H04M 2203/2088* (2013.01)

(58) Field of Classification Search
USPC .............................. 379/221, 220, 230, 202.01
See application file for complete search history.

(56) References Cited

U.S. PATENT DOCUMENTS

| | | | |
|---|---|---|---|
| 2004/0133641 A1* | 7/2004 | McKinnon et al. | 709/204 |
| 2008/0049648 A1* | 2/2008 | Liu et al. | 370/310 |
| 2009/0274163 A1* | 11/2009 | Huang et al. | 370/432 |
| 2009/0307349 A1* | 12/2009 | Harris et al. | 709/224 |
| 2010/0034367 A1* | 2/2010 | Das et al. | 379/202.01 |
| 2010/0216502 A1* | 8/2010 | Hardin | 455/518 |

* cited by examiner

*Primary Examiner* — William Deane, Jr.

(57) ABSTRACT

A method and apparatus for providing a repeat calling service feature in a communication network are disclosed. For example, the method captures call session information between a calling endpoint and a called endpoint of a failed call due to an unavailability of required network resource. The method then receives a repeat calling service request from the calling endpoint, and processes the repeat calling service request to reestablish a call between the calling endpoint and the called endpoint.

13 Claims, 3 Drawing Sheets

METHOD AND APPARATUS FOR PROVIDING REPEAT CALLING

The present invention relates generally to communication network and, more particularly, to a method and apparatus for providing repeat calling in communication networks, e.g., packet networks such as Internet Protocol (IP) based networks with Quality of Service (QoS) support.

BACKGROUND OF THE INVENTION

In an Internet Protocol (IP) based advanced network that supports Quality of Service (QoS) requirements, successful network resource reservation for supporting the QoS guarantee is required before a new service session can be established. For instance, a user may request to establish a service session that requires a large amount of network resource, such as high bandwidth calls that involve video sharing, video on demand, network gaming applications and the like, from a congested wireless network location, but the required QoS cannot be guaranteed. Under this scenario, the requested service session will be rejected. Calls may also be rejected due to temporary resource unavailability along the end-to-end call path that causes the service session request to fail. The QoS architecture of these IP based advanced network also incorporates policy definition functions that define resource needs for a particular service and direct the involved parties (e.g., endpoint devices, session control functions, and applications) to re-negotiate QoS requirements if resource availability is limited. When the required resource cannot be successfully negotiated, then a call request can fail. Such call request failures will lead to dissatisfaction and frustration for a customer.

SUMMARY OF THE INVENTION

In one embodiment, the present invention provides a method and apparatus for providing a repeat calling service feature in a communication network. For example, the method captures call session information between a calling endpoint and a called endpoint of a failed call due to an unavailability of required network resource. The method then receives a repeat calling service request from the calling endpoint, and processes the repeat calling service request to reestablish a call between the calling endpoint and the called endpoint.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
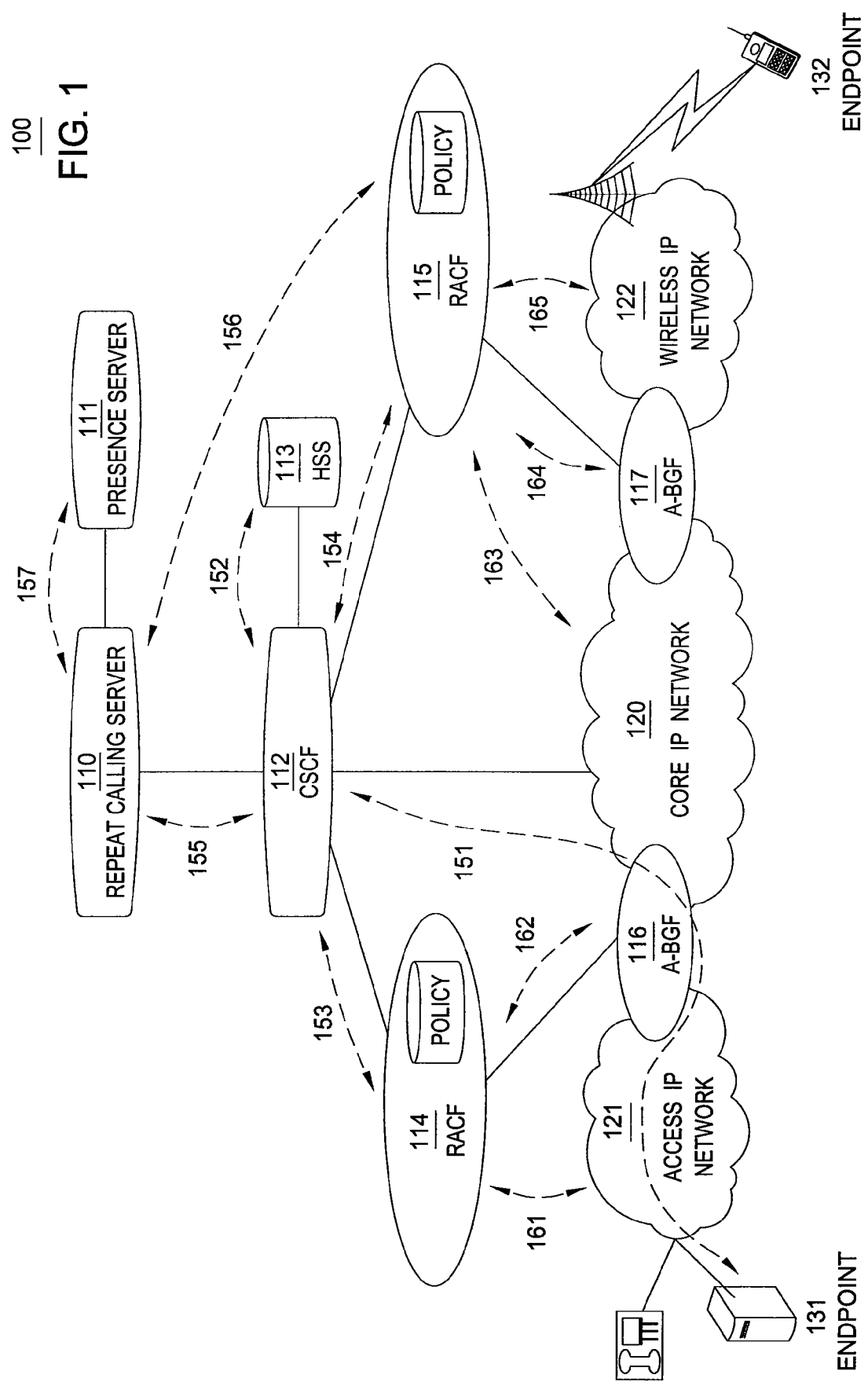
FIG. 1 illustrates an illustrative architecture of a communication network, e.g., a packet network such as an IP based network with QoS support, that support the repeat calling network service feature related to the present invention.

As discussed above, in an Internet Protocol (IP) based advanced network that supports Quality of Service (QoS) requirements, successful network resource reservation for supporting the QoS guarantee is required before a new service session can be established. In one scenario, service session requests may fail due solely to the lack of availability of sufficient network resources that are required not only to service the requested service session, but to service the requested service session in a manner that also meets the QoS guarantee.

Once the service session request has failed due to network resource related constraints, and if there is no support to automatically reestablish the failed call, then the user has to explicitly reestablish the call from time to time until a successful attempt is achieved. The manual service session reestablishment process is cumbersome and time consuming and creates dissatisfaction and frustration for the customer.

To address this criticality, the present invention enables a repeat calling service feature in the communication networks, e.g., packet networks such as IP based networks with QoS support. In one embodiment, the present invention enables a novel repeat calling network service feature that allows a calling party to request an IP based network with QoS support to automatically reestablish in the background a previously failed service session request due to network resource constraints once the required network resources become available in the near future.

In one embodiment, the present invention enables the network to initiate a session establishment automatically on behalf of a requesting user, the calling party, upon detection of network resource availability. For example, the repeat calling feature can be activated by the calling party by dialing a special dial sequence, such as *66. It should be noted the present invention is not limited to a particular dial sequence, which can selectively configured by a service provider.

In one embodiment, the present invention uses a location aware presence server to track the current locations, availability, and access networks of both the calling party and the called party to support the call reestablishment (e.g., broadly referred to as service session reestablishment) and, hence, allowing the endpoint devices to be mobile or nomadic. Namely, when the required network resource becomes available, the previously failed call attempt (broadly a service request) can be reestablished automatically at the most current locations of both the calling and the called parties. This service feature alleviates the user from having to repeatedly make the service request.

In one embodiment, the present invention provides users with the same features consistently across different types of access networks (e.g., wireless or wireline access networks) and user endpoint devices (e.g., wireless or wired endpoint devices). For example, a user can start a video on demand (VOD) session from a home set top box (STB) and can continue or transition the VOD session to the user's third generation (3G) mobile phone when the user has to leave home. A user may also try to request for video sharing when he is in a downtown area where the wireless network is typically congested and so on.

FIG. 1 illustrates an exemplary communication network 100, e.g. a packet network such as an IP based network with QoS support requirement, that supports a repeat calling network service feature related to the present invention. For example, core IP network 120 is an IP based network that support QoS. Core IP network 120 is connected to an access IP network 121 and an access wireless IP network 122 via Access-Border Gateway Function (A-BGF) network elements 116 and 117, respectively. User endpoints (e.g., a computer, a laptop, a mobile phone, a personal digital assistant (PDA), and the like) 131 and 132 are using access networks 121 and 122, respectively to access network services provided by core IP network 120.

In one embodiment, an A-BGF network element is a packet gateway between an access network and a core network that is used to mask a service provider's network from the access networks, through which Customer Premise Equipment (CPE) accessing packet-based services (e.g., IP based network services). An A-BGF may provide gateway control, packet filtering and inspection, traffic classification, policing and shaping, network address translation, media relay, and the like.

In one embodiment, Call Session Control Function (CSCF) network element 112 is an IP Multimedia Services (IMS) based session control layer network element that is responsible for call session setup, mid-session control, and teardown. Note the CSCF 112 can perform one or more of the following functions:

Proxy CSCF (P-CSCF) function that acts as the point of entry to the service control platform that includes 112, 113, 114, 115, etc. with well-known addresses within the network and routes incoming requests based on registration status;

Interrogating CSCF (I-CSCF) function that provides topology hiding and helps forward requests between P-CSCF and Serving-CSCF as well as Application Servers; and Serving CSCF (S-CSCF) function provides session control, call signaling routing to applications, and SIP registrar functions.

In one embodiment, the CSCF 112 interfaces and communicates with various application servers, such as a Repeat Calling Server (RCS) 110 and a Presence Server (PS) 111, to invoke one or more service features during a call setup for applicable network service subscribers, e.g., if a subscriber has subscribed to the repeat calling network service feature. For example, in the case of a subscriber who has subscribed to the repeat calling service feature, a subscriber service profile for the subscriber will include a set of initial Filter Criteria (iFCs) that direct the CSCF 112 to invoke certain applications when certain criteria are met at a particular point of the call processing, known as Service Point Triggers (SPT). A new iFC can be provisioned to a subscriber profile such that, when that subscriber dials a special key sequence (e.g., *66), the CSCF 112 will invoke Repeat Calling Server 110 to handle the repeat calling service for the calling subscriber. In one embodiment, the Repeat Calling Server (RCS) 110 is an application server that processes the repeat calling network service feature upon requests by the calling endpoint subscribers.

In one embodiment, the Home Subscriber Server (HSS) 113 is an IP-based Authentication, Authorization, and/or Accounting (AAA) server that contains a master database for subscriber profiles, registration data, and network policy rules.

In one embodiment, the Resource and Admission Control Function (RACF) network elements 114 and 115 act as arbitrators for QoS related transport resource negotiation and reservation between the CSCF 112 and core network 120 as well as the access networks 121 and 122 based on user profiles, Service Level Agreements (SLA), operator network policy rules, service priority, and resource availability associated with these networks. For example, the RACFs 114 and 115 support policy definition functions (PDF) to handle policy setting per session, QoS negotiation between the underlying access and core networks, and authorize usage of network resources. In essence, RACFs 114 and 115 enforce the service policies for QoS by ensuring availability of resources for a service session request.

In one embodiment, the RACFs 114 and 115 interface with the RSC 110 to provide support of the repeat calling service feature. This interface supports methods for the RSC 110 to activate and de-activate a resource watching trigger in the RACFs 114 and 115 for a particular set of network resources that are required for a particular session service request. This interface also supports methods for the RACFs 114 and 115 to notify the RSC 110 when there is an availability increase, change of network resource status, of the network resources that are being monitored.

In one embodiment, Presence Server (PS) 111 manages information on a user's location, context, presence (e.g., current location, availability, preferred means of communication, etc.) and enables communication services to take advantage of the presence related information. In one embodiment, the RCS 110 interfaces with the PS 111 to allow the RCS 110 to place a watch request to the PS 111 so that the PS 111 can inform the RCS 110 if there is a change in the calling party's and the called party's presence status.

It should be noted that although FIG. 1 illustrates the RACFs 114, 115, the CSCF 112, the HSS 113, the RCS 110 and the PS 111 as being external to the core IP network 120, these elements or components can in fact be deployed within the core IP network 120. Furthermore, it should be noted that any number of RACF, CSCF, HSS, RCS and PS can be deployed in accordance with the requirements of a particular implementation without departing from the scope of the present invention.

To further illustrate an end to end view as to how the various network components interact to support the repeat calling service feature, an illustrative scenario of a session service request placed by the endpoint 131 (the calling party) to the endpoint 132 (the called party), is described herein. In FIG. 1, endpoint 131 has subscribed to the repeat calling service feature and places a call, e.g., a video call, to endpoint 132 using flow 151. Upon receiving the call setup request from endpoint 131, CSCF 112 interfaces with the HSS 113 to retrieve the subscriber profile for the endpoint 131 using flow 152. An iFC in the subscriber profile indicates that the endpoint 131 has subscribed to the repeat calling service feature.

However, it should be noted that the behavior of the CSCF may be slightly different in accordance with the IMS standard. For example, under the IMS standard each endpoint must keep a valid registration in the CSCF. As such, the CSCF will retrieve the service profile data when an endpoint successfully completes its registration or re-registration procedures. Although the present disclosure may describe the behavior of the SCSF in a slightly different approach, it should be noted that this alternative approach is equally applicable if the core network complies with the IMS standard.

In turn, CSCF 112 interfaces with RACFs 114 and 115 to determine resource admission and reservation using flows 153 and 154, respectively. RACF 115 responds to CSCF 112 that the call cannot be setup because resource reservation has failed due to congestion in the wireless IP network 122. On the other hand, RACF 114 indicates that there is no network resource problem to CSCF 112. Note that RACFs 114 and 115 may fail a call due to resource unavailability in any part of the end-to-end network path, e.g., originating access IP network 121, core IP network 120, terminating wireless IP network 122, originating A-BGF 116 or terminating A-BGF 117.

In this illustrative scenario, RACFs 114 and 115 monitor and oversee different part of the networks regarding network resource reservation and availability. For example, RACF 114 oversees network resource reservation and availability of access IP network 121 and A-BGF 116 using flows 161 and 162 respectively, whereas RACF 115 oversees network resource reservation and availability of the core IP network 120, A-BGF 117, and the wireless IP network 122 using flows 163, 164 and 165, respectively.

Due to the iFC retrieved from HSS 113 indicating that the endpoint 131 has subscribed to the repeat calling service feature, CSCF 112 has been including RCS 110 in the signaling path using flow 155. Hence, RCS 110 caches all the call session information from the CSCF 112, including the signaling messages sent by RACFs 114 and 115 which are forwarded by the CSCF 112, for the call request.

Because of an inadequate network resource indication returned by RACF 115, CSCF 112 fails the call session request and returns an error to the endpoint 131 indicating the result using flow 151. The user of endpoint 131 subsequently hangs up. The user then uses endpoint 131 to dial a predefined special sequence (such as *66) provided by the service provider to activate the call repeating feature for the failed call. Endpoint 131 sends the SIP request messages to CSCF 112 for processing using flow 151.

Upon receiving the call repeating request from endpoint 131 activated by the special dial sequence (such as *66), CSCF 112 forwards the call to RCS 110 (using flow 155) based on a second iFC retrieved from HSS 113 (using flow 152) associated with the repeat calling feature. RCS 110 then moves the cached information about the previous failed call of endpoint 131 into a memory, e.g., a non-volatile memory (not shown). Repeat Calling Server 110 then sends a request to RACF 115 using flow 156 to subscribe to a notification once the originally unavailable network resource becomes available in the near future. Optionally, the RCS can send a request to both RACF 115 and RACF 114. Repeat Calling Server 110 also sends a request to the Presence Server 111 using flow 157 to subscribe to a notification when either the endpoint 131 (the calling party), or the endpoint 132 (the called party), has a presence status change (e.g., change of location or availability).

RACF 115 or PS 111 notifies Repeating Calling Server 110 upon detecting resource status or presence status change using flow 156 and flow 157, respectively. Once the previously unavailable network resource becomes available and both endpoints 131 and 132 are present and available, Repeat Calling Server 110 then reestablishes the call by using a 3-party call control procedure. In other words, RCS 110 establishes a call to the endpoint 131 and another call to the endpoint 132 and then bridges the call to involve the two endpoints only. Note the endpoint 132 may have moved to a different location, e.g., a different wireless IP network, when the call is reestablished. If the call is setup successfully, Repeat Calling Server 110 stops caching the call session information of the previous failed call attempt. RCS 110 then un-subscribes to the RACF 115 using flow 156 to stop watching the resource availability. RCS 110 also un-subscribes to the Presence Server 111 using flow 157 to stop watching the presence status of the endpoint 131 and the endpoint 132.

Figure 2:
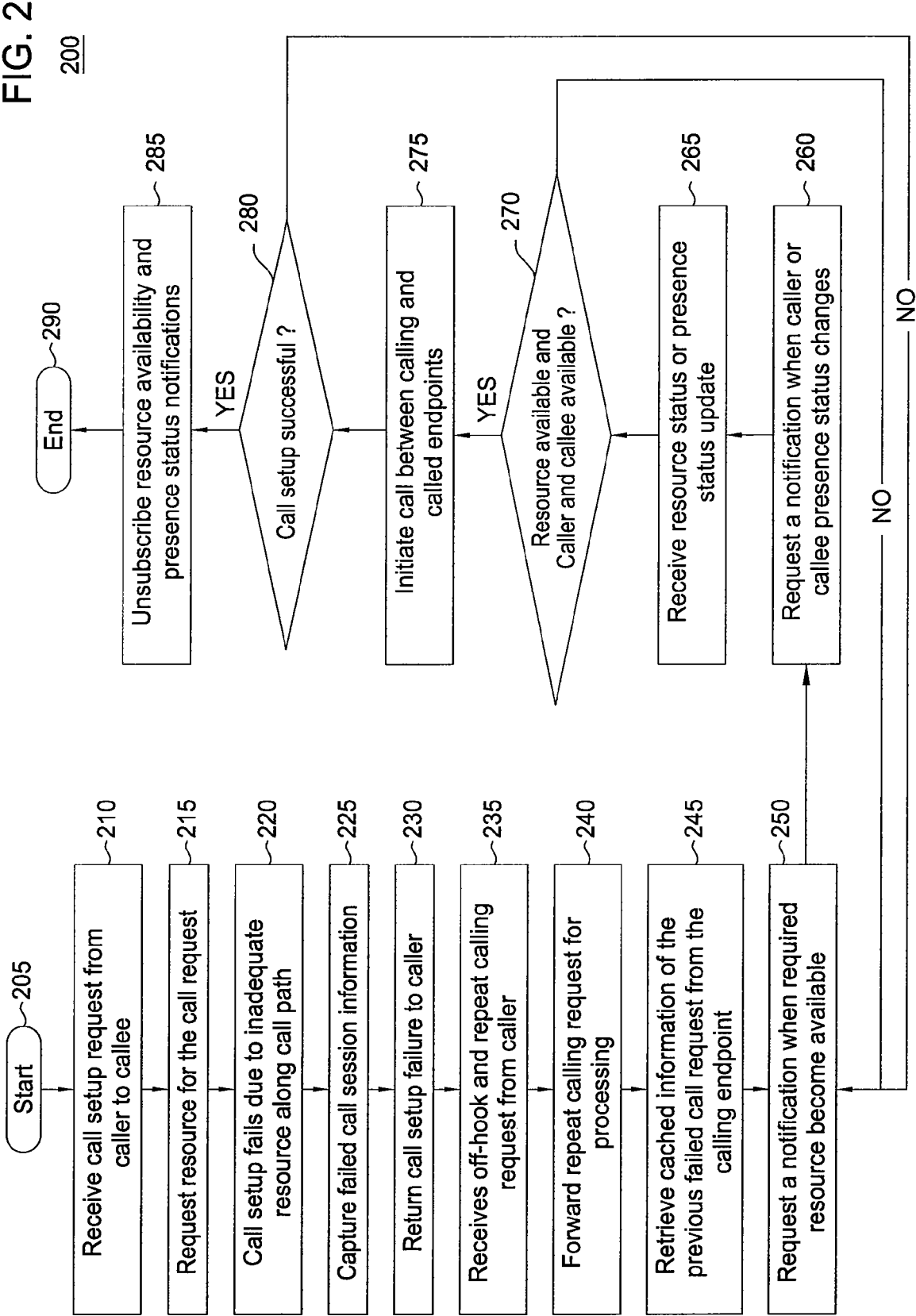
FIG. 2 illustrates a flowchart of a method for providing a repeat calling service feature in communications networks, e.g., packet networks such as IP based networks with QoS support, of the present invention.

FIG. 2 illustrates a flowchart of a method 200 for providing a repeat calling service feature in communications networks, e.g., packet networks such as IP based networks with QoS support, of the present invention. Method 200 starts in step 205 and proceeds to step 210.

In step 210, the method receives a call setup request (broadly a service request) from a calling endpoint to a called endpoint and retrieves the associated subscriber profile, including an initial iFC, of the calling endpoint. For example, the call setup is received and the subscriber profile is retrieved by the CSCF network element. For example, the subscriber profile is retrieved from an HSS. It should be noted that in one embodiment, when the CSCF receives the call setup request, it will forward all SIP messages through the RCS based on the initial iFC.

In step 215, the method requests network resources to support the incoming call request from the calling endpoint. For example, the CSCF network element requests the required network resources from one or more RACF network elements to service the call setup request.

In step 220, the method receives a response or determines that the call cannot be successfully setup due to inadequate network resources in the end-to-end network path. For example, the CSCF receives a response from one or more RACF network elements indicating that the required network resources to complete the call setup are not available. Note that different RACF network elements oversee network resource reservation and availability of different parts of the end-to-end networks.

In step 225, the method captures all call session information associated with the failed call attempt from the CSCF network element and one or more RACF network elements. The call session information is forwarded by the CSCF, due to the initial iFC retrieved in step 210 indicating that the calling endpoint has subscribed to the repeat calling service feature, to the RCS to be captured.

In step 230, the method returns a call setup failure response to the calling endpoint. For example, the response is sent by the CSCF network element to the calling endpoint.

In step 235, the method receives a predefined special dial sequence (such as *66) from the off-hook calling endpoint. The predefined special dial sequence is a configurable sequence set by the network service provider. For example, the CSCF network element receives the special dial sequence and then retrieves a second iFC associated with the received special dial sequence within the subscriber profile of the calling endpoint from the HSS.

In step 240, the method, based on the second iFC retrieved, invokes the RCS to process the repeat calling service request from the calling endpoint. For example, the RCS is invoked by the CSCF network element.

In step 245, the method retrieves the call session information of the previous failed call initiated by the calling endpoint from a non-volatile memory.

In step 250, the method subscribes to the RACF that failed the previous call attempt, due to previous network resource unavailability, to request a notification to indicate a change in network resource status once the required network resource becomes available in the near future. For example, the RACF notification is subscribed by the RSC.

In step 260, the method subscribes to the PS to request a notification to indicate a change of presence status, e.g., current location and availability, of the calling and the called endpoints. For example, the PS notification is subscribed by the RSC.

In step 265, the method receives a change in status of required network resource availability from the RACF and/or a change in presence status of one or both endpoints from the PS. For example, the changes of status notifications are received by the RCS.

In step 270, the method checks if the required resource is available and both the calling and the called endpoints are available to complete the repeat call service request. For example, the check is performed by the RCS. If the required resource is available and both the calling and the called endpoints are available to complete the repeat call service request, the method proceeds to step 275; otherwise, the method proceeds back to step 250.

In step 275, the method reestablishes a call between the calling endpoint and the called endpoint using a 3-party call control procedure. For example, the call is reestablished by the RCS.

In step 280, the method checks if the call has been setup successfully. For example, the check is performed by the RCS. If the call has been setup successfully, then the method proceeds to step 285; otherwise, the method proceeds back to step 250.

In one embodiment, the present method will limit the number of re-tries, e.g., from the loop-back of step 280 or step 270 back to step 250. This can be accomplished by a system level parameter in the RCS that is used to decide how many times re-tries or how long the repeat calling request should remain valid. Furthermore, the present method may also allow a user to specify the retry limit or duration e.g., when dialing the *66 sequence.

In step 285, the method un-subscribes the resource availability status change and the presence status change notifications from the RACF and the PS, respectively. For example, the resource availability status change and the presence status change notifications are unsubscribed by the RCS. The method ends in step 290.

It should be noted that one or more steps of method 200 can be deemed to be optional and can be omitted. For example, if the repeat calling service feature is implemented without the need to determine the present location (i.e., presence status) of the calling endpoint and called endpoint, then step 260 can be omitted and so on.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
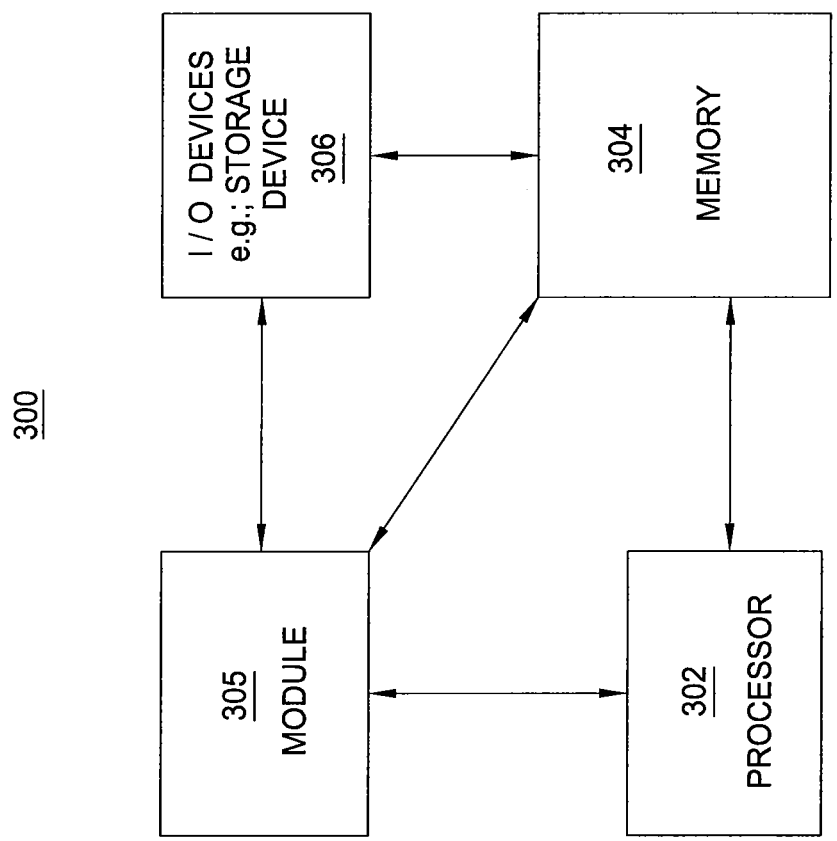
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing a repeat calling service feature in communication networks, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing a repeat calling service feature in communication networks can be loaded into memory 304 and executed by processor 302 to implement the functions as discussed above. As such, the present process 305 for providing a repeat calling service feature in communication networks (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for reestablishing a call in a communication network, the method comprising:
    capturing, by a processor, call session information between a calling endpoint and a called endpoint of a failed call due to an unavailability of a required network resource;
    receiving, by the processor, a repeat calling service request from the calling endpoint; and
    processing, by the processor, the repeat calling service request to reestablish the call between the calling endpoint and the called endpoint, wherein the processing comprises:
        invoking a repeat calling server to process the repeat calling service request, wherein the invoking comprises:
            retrieving the call session information of the failed call from a memory;
            subscribing to a resource and admission control function network element to receive a notification of an availability of the required network resource;
            subscribing to a presence server to receive a notification of a change in a presence status, wherein the presence status comprises a location and an availability of the calling endpoint and the called endpoint for completing the repeat calling service request; and
            reestablishing the call.

2. The method of claim 1, wherein the communication network comprises a packet network with quality of service support.

3. The method of claim 1, wherein the repeat calling service request is activated by the calling endpoint by sending a predefined dial sequence to the communication network.

4. The method of claim 1, wherein the call is reestablished when the required network resource becomes available and both of the calling endpoint and the called endpoint are available.

5. The method of claim 1, wherein the reestablishing comprises:
    setting up the call between the calling endpoint and the called endpoint by the repeat calling server using a 3-party call control procedure.

6. The method of claim 1, wherein the repeat calling server is invoked by a call session control function network element based on an initial filter criteria associated with a subscriber profile of the calling endpoint retrieved from a home subscriber server.

7. The method of claim 1, wherein the call session information of the failed call is captured by the repeat calling server that is in a call signaling path of the failed call.

8. A non-transitory computer-readable medium storing a plurality of instructions which, when executed by a processor, cause the processor to perform operations for reestablishing a call in a communication network, the operations comprising:

capturing call session information between a calling endpoint and a called endpoint of a failed call due to an unavailability of a required network resource;

receiving a repeat calling service request from the calling endpoint; and processing the repeat calling service request to reestablish the call between the calling endpoint and the called endpoint, wherein the processing comprises:

invoking a repeat calling server to process the repeat calling service request, wherein the invoking comprises:

retrieving the call session information of the failed call from a memory;

subscribing to a resource and admission control function network element to receive a notification of an availability of the required network resource;

subscribing to a presence server to receive a notification of a change in a presence status, wherein the presence status comprises a location and an availability of the calling endpoint and the called endpoint for completing the repeat calling service request; and reestablishing the call.

9. The non-transitory computer-readable medium of claim 8, wherein the communication network comprises a packet network with quality of service support.

10. The non-transitory computer-readable medium of claim 8, wherein the repeat calling service request is activated by the calling endpoint by sending a predefined dial sequence to the communication network.

11. The non-transitory computer-readable medium of claim 8, wherein the call is reestablished when the required network resource becomes available and both of the calling endpoint and the called endpoint are available.

12. The non-transitory computer-readable medium of claim 8, wherein the reestablishing comprises:

setting up the call between the calling endpoint and the called endpoint by the repeat calling server using a 3-party call control procedure.

13. An apparatus for reestablishing a call in a communication network, the apparatus comprising:

a processor; and a computer readable medium storing a plurality of instructions which, when executed by the processor, cause the processor to perform operations, the operations comprising:

capturing call session information between a calling endpoint and a called endpoint of a failed call due to an unavailability of a required network resource;

receiving a repeat calling service request from the calling endpoint; and processing the repeat calling service request to reestablish the call between the calling endpoint and the called endpoint, wherein the processing comprises:

invoking a repeat calling server to process the repeat calling service request, wherein the invoking comprises:

retrieving the call session information of the failed call from a memory;

subscribing to a resource and admission control function network element to receive a notification of an availability of the required network resource;

subscribing to a presence server to receive a notification of a change in a presence status, wherein the presence status comprises a location and an availability of the calling endpoint and the called endpoint for completing the repeat calling service request; and reestablishing the call.

\* \* \* \* \*